United States Patent [19]
Prescott et al.

[11] 3,800,001
[45] Mar. 26, 1974

[54] ETHYL CHLORIDE PYROLYSIS AND USE OF ETHYLENE AND HYDROGEN CHLORIDE IN ALKYLATION

[75] Inventors: Gerald F. Prescott; Charles T. Lewis, Jr.; William R. Owens, all of Nederland, Tex.

[73] Assignee: Texaco Inc., New York, N.Y.

[22] Filed: Sept. 28, 1972

[21] Appl. No.: 293,222

[52] U.S. Cl............... 260/683.53, 260/683.57
[51] Int. Cl............................................. C07c 3/56
[58] Field of Search.................. 260/683.53, 683.57

[56] References Cited
UNITED STATES PATENTS

| | | | |
|---|---|---|---|
| 2,360,547 | 10/1944 | Chenicek | 260/683.53 |
| 2,389,739 | 11/1945 | Pevere | 260/683.57 |
| 2,531,294 | 11/1950 | Pickell | 260/683.53 |
| 3,342,885 | 9/1967 | Hutson, Jr. | 260/683.53 |
| 3,506,409 | 4/1970 | Hutson, Jr. et al. | 260/683.53 |

*Primary Examiner*—Delbert E. Gantz
*Assistant Examiner*—G. J. Crasanakis
*Attorney, Agent, or Firm*—T. H. Whaley; C. G. Ries

[57] ABSTRACT

Isobutane is alkylated with ethylene in the presence of HCl promoted aluminum chloride alkylation catalyst; ethyl chloride is a by-product formed and recovered from the hydrocarbon effluent in a normal butane - ethyl chloride fraction. The normal-butane-ethyl chloride fraction is pyrolyzed at 400°–1,000° F with bauxite catalyst to form ethylene, hydrogen chloride along with normal butane; the normal butane is separated from the mixture, by condensation, and the remaining vapor stream of ethylene and hydrogen fluoride is recycled to the alkylation reaction.

8 Claims, 1 Drawing Figure

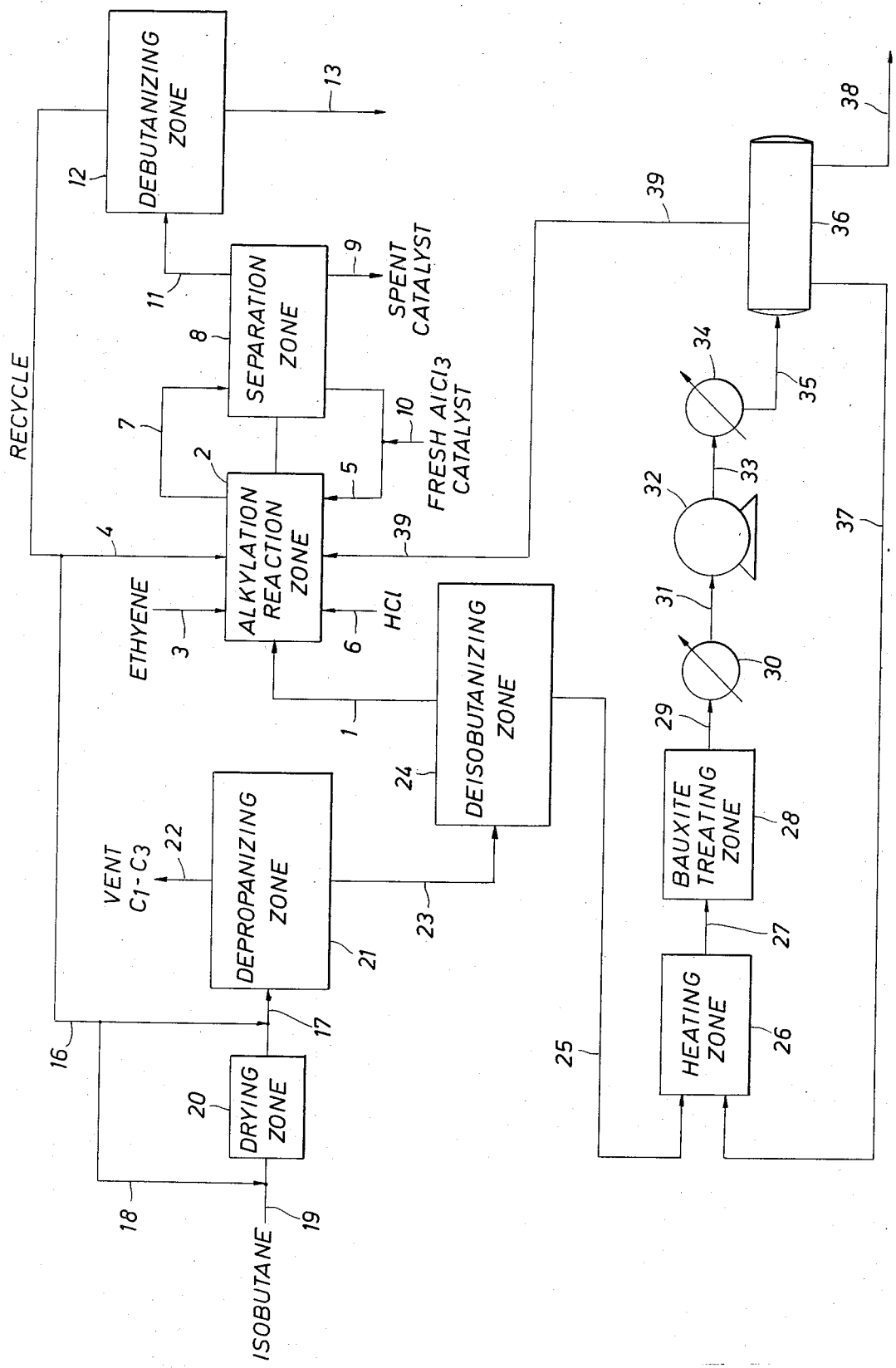

ETHYL CHLORIDE PYROLYSIS AND USE OF ETHYLENE AND HYDROGEN CHLORIDE IN ALKYLATION

This application is related to U.S. Pat. application Ser. No. 263,890, filed June 19, 1972 U.S. Pat. application Ser. No. 263,887, filed June 19, 1972; and U.S. Pat. application Ser. No. 263,888, filed June 19, 1972.

BACKGROUND OF THE INVENTION

The present invention relates to the alkylation of isoparaffin hydrocarbons with olefin hydrocarbons to produce branched chain paraffin hydrocarbons, in the presence of an aluminum chloride alkylation catalyst, wherein the catalytic activity of the aluminum chloride is promoted with hydrogen chloride. More particularly, the present invention relates to an improved method for recovering ethyl chloride reaction by-product of the alkylation reaction and pyrolyzing such ethyl chloride to ethylene and hydrogen chloride. Specifically, the improvement comprises a continuous ethylene alkylation process wherein a stream comprising isobutane, normal butane, ethylene, ethyl chloride and $C_1$–$C_3$ paraffin hydrocarbons is separated from an alkylation reaction effluent, wherein a major portion of said recycle stream is returned to the alkylation reaction, and wherein a minor portion is fractionated into a $C_1$–$C_3$ fraction, an isobutane fraction for recycle to the process, and a normal butane-ethyl chloride fraction. Subsequently, the normal butane-ethyl chloride fraction is pyrolyzed at a temperature of about 400-1000°F. in the presence of bauxite to convert ethyl chloride into ethylene and hydrogen chloride.

Alkylation of branched chain isoparaffin hydrocarbons with olefin hydrocarbons in the presence of alkylation catalysts is well known. Processes for the alkylation of relatively low molecular weight isoparaffin hydrocarbons such as isobutane, isopentane, etc. wwth olefin hydrocarbons such as ethylene, propylene, and butylene, to produce branched chain hydrocarbons suitable for use in motor fuel are widely practiced in commercial facilities. With the increasing emphasis upon removing pollutants from automobile motor exhausts, the alkylation of isobutane with ethylene is becoming increasingly more important. The major product obtained in alkylating isobutane with ethylene is 2,3-dimethylbutane which has an unleaded Research Octane Number in excess of 100 and which is particularly useful as a component in automobile motor fuels. Many processes have been developed for the alkylation of isobutane with ethylene to form 2,3-dimethylbutane employing aluminum chloride as an alkylation catalyst. References to prior art disclosing such processes include U.S. Pat. Nos. 3,485,893; 2,814,654; 3,470,264; and 3,513,219. Additional prior art references include *Hydrocarbon Processing*, "Alkylate Ethylene for Motor Fuel," May, 1971, pp. 119-121; and *Hydrocarbon Processing*, "DIP Alkylation," September, 1970, p. 200.

Aluminum chloride catalyzed alkylation reactions of isobutane with ethylene are carried out in the liquid phase under conditions such that a hydrocarbon phase comprising isobutane is maintained in intimate contact with a liquid catalyst phase comprising an aluminum chloride-hydrocarbon complex. Alkylation reaction conditions include temperatures in the range of from about 70°–150° F., pressures of from about 45-400 psia, and residence times of reactants under alkylating conditions of from about 30 seconds to about 60 minutes. Isobutane to ethylene molar ratios of from about 2:1 to about 25:1 may be employed and volume ratios of liquid hydrocarbon phase to aluminum chloride-hydrocarbon complex catalyst phase of from about 1:0.5 to about 1:3 may be employed.

Ethylene charge stocks to such an alkylation process need not be completely pure, and may contain such impurities as propylene, propane, and ethane. Propylene will alkylate substantially completely with isobutane under alkylation reaction conditions normally employed. Propane and ethane, however, are unaffected by the alkylation reaction. In a continuous alkylation process employing recycle streams of unreacted ethylene, such propane and ethane must be removed from the alkylation process to control the operating pressure required to maintain liquid phase operation. Propane and ethane are generally removed from an alkylation process by venting as a gas stream. Any unreacted ethylene in admixture with such propane and ethane is vented and thereby lost to the process. Therefore, it is desirable that a relatively high conversion of ethylene charge be obtained in the alkylation reaction either by obtaining a high ethylene conversion on a one-pass basis or by recycling an ethylene containing stream to the alkylation reactions.

Isobutane charge may contain impurities, such as propane and normal butane, which are not converted in the alkylation process. As isobutane is commonly employed in substantial molar excess to ethylene charge in an alkylation process, it is common practice to recycle an isobutane containing stream to the alkylation reaction. The impurities such as propane and normal butane, if allowed to accumulate in the isobutane recycle stream, would soon reach a concentration sufficient to interfere with the alkylation reaction by diluting the isobutane concentration in the hydrocarbon phase. Therefore, in commercial processes, the isobutane for recycle is commonly treated to separate propane and normal butane therefrom.

In commercial ethylene alkylation processes, an alkylation reaction effluent mixture is separated into a catalyst phase and a hydrocarbon phase by liquid-liquid separation means. The hydrocarbon phase comprises alkylated hydrocarbons, isobutane, unreacted ethylene, ethyl chloride and undesirable materials including methane, ethane, propane, and normal butane which have entered the process mainly as components of the ethylene and isobutane charge streams. As isobutane is used in the alkylation reaction in substantial molar excess, it is common practice to treat the hydrocarbon effluent from an alkylation reaction in a plurality of fractionation zones to recover a stream comprising isobutane which is recycled within the process to the alkylation reaction. In order to prevent an increasing accumulation of nonreactive materials such as methane, ethane, propane and normal butane within the process, the hydrocarbon effluent from an alkylation reaction may be fractionated to recover a $C_1$–$C_3$ stream, an isobutane stream substantially free of normal butane, and a normal butane and heavier stream. The $C_1$–$C_3$ is vented or otherwise removed from the process and contains essentially all the unreacted ethylene. As ethylene is a relatively expensive charge stock, commercial processes are operated at reaction severities sufficient to insure a high degree of ethylene conversion such that ethylene losses in the $C_1$–$C_3$ stream are minimized. Increased reaction severities obtained by increased reaction temperatures, increased residence times, or combinations of these operating variables which insure high ethylene conversion rates also contribute to the formation of unwanted by-products such as polymers and heavy alkylates which are formed at the expense of the desirable 2,3-dimethylbutane.

The normal butane and heavier fraction of the alkylation reaction hydrocarbon effluent comprises normal butane, ethyl chloride, and alkylated hydrocarbons. Normal butane and ethyl chloride are undesirable components in an alkylate stream which is to be used for motor fuel. Excessive normal butane increases the vapor pressure of the alkylate above a desired value and ethyl chloride decreases the octane number response of alkylate upon the addition of lead compounds to such alkylate. Consequently, the normal butane and heavier fractions are commonly treated by means such as fractionation to remove normal butane and ethyl chloride therefrom.

One method for removing ethyl chloride from an alkylation product stream comprising alkylated hydrocarbons is disclosed in U.S. Pat. No. 2,410,498. This disclosed process comprises contacting an ethyl chloride containing hydrocarbon product from an alkylation reaction with a conversion catalyst, such as bauxite, at an elevated temperature in the range of 600°–1,000° F. to convert ethyl chloride into ethylene and hydrogen chloride. Hydrogen chloride is removed from the treated alkylate stream by such means as caustic washing. Ethylene is removed by such means as fractional distillation wherein the ethylene is separated in admixture with other light hydrocarbons such as ethane and propane. In such an ethyl chloride removal process as disclosed in U.S. Pat. No. 2,410,498, ethylene regenerated by conversion of ethyl chloride is lost to the alkylation process by venting and hydrogen chloride is consumed by reaction with caustic in the aqueous caustic wash step.

The aqueous caustic wash admits water into the alkylation process which, if allowed to recirculate and contact the aluminum chloride alkylation catalyst, will react to form HCl and aluminum hydroxide. Additionally, water in the presence of hydrogen chloride is a corrosion hazard. Consequently, drying means are required to ensure that excessive amounts of water are not recirculated to the alkylation process.

As the ethyl chloride containing hydrocarbon effluent from an aluminum chloride catalyzed alkylation reaction comprises substantial amounts of unconverted isoparaffin hydorcarbons and alkylated hydrocarbons and only a small amount of ethyl chloride, the bauxite treating vessel must be quite large to handle the flow of hydrocarbons therethrough. Large heating means must also be provided for heating the alkylation reaction hydrocarbon effluent to a temperature sufficient for conversion of the ethyl chloride in the presence of the bauxite. At the preferred ethyl chloride conversion temperatures in the range of 600°–1,000° F. a portion of the alkylated hydrocarbon product may be cracked into undesirable products such as olefins and other low molecular weight hydrocarbons which adversely affect the quality of the alkylate hydrocarbon product.

Many isobutane streams commonly available for charge stocks to alkylation reaction processes contain impurities in addition to such inert impurities as propane and normal butane. Impurities such as butene-1, butene-2, methylpropene, butadiene-1,2, propyne, butyne-1, sulfur dioxide, and methylmercaptan are often found in isobutane streams available from petroleum refining processes. Such impurities as these all react with the aluminum chloride catalyst. The reaction of such impurities with the aluminum chloride catalyst reduces the catalytic activity or in some cases, such as the sulfur compounds, may destroy the catalytic effectiveness of the aluminum chloride for alkylation of isobutane with ethylene. Therefore, it is common practice to treat isobutane charge streams to remove such impurities prior to admitting such isobutane streams into the alkylation process. Treating methods such as caustic washing the isobutane streams, adsorbing impurities from the isobutane stream upon adsorbents such as molecular sieves, silica gel, etc., are well known in the prior art.

Aluminum chloride is an effective catalyst to promote alkylation of isobutane with ethylene. Aluminum chloride in the presence of hydrogen chloride and a hydrocarbon liquid reacts to form a viscous, reddish liquid complex of aluminum chloride and hydrocarbon. Aluminum chloride catalyst may be added to the alkylation process as aluminum chloride whereupon it will combine with hydrocarbons in the reaction zone to form a complex. Also the aluminum chloride may be added to the process as an aluminum chloride-hydrocarbon complex prepared in a separate facility. Additionally, the aluminum chloride catalyst may be prepared within the process by passing a mixture of hydrogen chloride and liquid hydrocarbon through a bed of metallic aluminum pellets or shavings. In the alkylation reaction zone, the aluminum chloride-hydrocarbon complex forms a liquid catalyst phase and the isobutane liquid forms a liquid reactant hydrocarbon phase. Intimate contact between the catalyst phase and the hydrocarbon phase is maintained by such means as mixing or agitation to form an emulsion of the two liquid phases. Upon completion of the reaction step, the alkylation reaction effluent is separated into a hydrocarbon phase and a catalyst phase by liquid-liquid separation techniques well known in the art, such as for example, settling, coalescing, etc.

Catalytic effectiveness of aluminum chloride is promoted by the presence of relatively small amounts of hydrogen chloride in the alkylation reaction. Hydrogen chloride may be admitted into the alkylation reaction as a gas which dissolves in the catalyst phase or may be generated therein by adding small amounts of water to the catalyst phase, whereupon a small portion of aluminum chloride reacts to form hydrogen chloride. Although hydrogen chloride promotes and increases catalytic effectiveness of aluminum chloride as an alkylation catalyst, hydrogen chloride also reacts with ethylene to form ethyl chloride. Consequently, a portion of ethylene charge to an alkylation process, wherein aluminum chloride catalyst is promoted with hydrogen chloride, is consumed by reaction with hydrogen chloride. Under normal reaction conditions ethylene concentration in the reaction charge mixture is substantially greater than hydrogen chloride concentration. As concentration of hydrogen chloride is increased to promote aluminum chloride catalytic activity, the amount of ethylene consumed by reaction with hydrogen chloride also increases. At relatively low concentrations of hydrogen chloride, aluminum chloride catalyst is not properly promoted and a substantial proportion of ethylene passes through the alkylation reaction process without being converted into desirable alkylated hydrocarbon products. According to the method disclosed in copending application Ser. No. 263,887 filed June 19, 1972, (D No. 72,749), aluminum chloride catalyst may be effectively promoted with small amounts of hydrogen chloride when ethyl chloride is also present as a catalyst promoter.

SUMMARY OF THE INVENTION

Now according to the method of the present invention, an improvement is disclosed for converting ethyl chloride by-product from an aluminum chloride catalyzed ethylene alkylation process into ethylene and hydrogen chloride. Additionally, an improved method is disclosed for recovering such ethylene and hydrogen chloride conversion products as recycle to an alkylation reaction zone. More particularly, in an alkylation process for alkylating isobutane with ethylene in the presence of a hydrogen chloride promoted aluminum chloride alkylation catalyst, wherein an alkylation reaction hydrocarbon effluent is produced which comprises isobutane, alkylated hydrocarbons, ethyl chloride, normal butane, and $C_1$–$C_3$ range hydrocarbons, a preferred embodiment of the present invention comprises: fractionating the alkylation hydrocarbon effluent into a recycle isobutane fraction, an alkylated hydrocarbon fraction, a $C_1$–$C_3$ hydrocarbon fraction, and a fraction comprising ethyl chloride and normal butane; contacting the ethyl chloride-normal butane fraction in the vapor phase with bauxite catalysts in the temperature range of 400°–1,000° F. for conversion of ethyl chloride to ethylene and hydrogen chloride; condensing normal butane from the bauxite treating step effluent to yield a gas stream comprising ethylene and hydrogen chloride; and recycling ethylene and hydrogen chloride to the alkylation reaction.

By following the method of the present invention, ethylene in an amount of about 2–3% of ethylene charged to the alkylation process and hydrogen-chloride in an amount of about 90% of that required to promote the alkylation catalyst activity may be recovered for recycle to the alkylation process. Additionally, ethyl chloride which has a deleterious effect upon motor fuels is removed from the alkylated hydrocarbon stream without creating a problem of ethyl chloride disposal. Other advantages of the present method over prior art methods which disclose converting ethyl chloride contained in an alkylation reaction effluent include: a reduced bauxite treating zone since only ethyl chloride in admixture with any normal butane present is contacted with hot bauxite; alkylated hydrocarbons are not subjected to high temperatures which might cause thermal cracking and a caustic wash system to neutralize hydrogen chloride is not required, as hydrogen chloride is recycled to the alkylation process. These, and other advantages, will be more fully described in the detailed description which follows.

BRIEF DESCRIPTION OF THE DRAWING

The attached drawing is a schematic representation of one process for alkylating isobutane with ethylene embodying improvements of the present invention.

DETAILED DESCRIPTION OF THE INVENTION

Alkylation of isobutane with ethylene in the presence of an aluminum chloride alkylation catalyst is well known. Such alkylation reactions are carried out in the liquid phase at temperatures of from about 70° F. to about 150° F., pressures of from about 45 psia to about 400 psia, residence times of from about 30 seconds to about 60 minutes, and with molar ratios of isobutane to ethylene of from about 2:1 to about 25:1.

Aluminum chloride under alkylation conditions forms a complex with hydrocarbons which is a heavy reddish liquid substantially insoluble in liquid hydrocarbon reactants of the alkylation reaction mixture. The aluminum chloride alkylation catalyst may be added to the alkylation reaction as aluminum chloride or as an aluminum chloride-hydrocarbon complex. When catalyst is added to the alkylation reaction as aluminum chloride, it complexes with hydrocarbons in the reaction mixture. Additionally, an aluminum chloride-hydrocarbon complex may be generated within the process by mixing hydrogen chloride and liquid hydrocarbon and contacting this mixture with metallic aluminum in the form of pellets or shavings. The preferred volume ratio of aluminum chloride-hydrocarbon complex catalyst to liquid hydrocarbon reactants in the alkylation reaction is in the range of from about 0.5:1 to about 3:1.

Catalytic activity of aluminum chloride as a catalyst for alkylating isobutane with ethylene may be substantially increased by employing catalyst promoters in the alkylation reaction mixture. Hydrogen chloride in a ratio of from about 7 to about 23 pounds of hydrogen chloride per barrel of ethylene charge is an effective catalyst promoter. However, the hydrogen chloride reacts with a portion of the ethylene reactant to form ethyl chloride. It has been found, however, that the amount of hydrogen chloride promoter may be substantially reduced by employing ethyl chloride with hydrogen chloride as alkylation catalyst promoter. The use of ethyl chloride and hydrogen chloride as promoters for aluminum chloride alkylation catalysts is described in more detail in copending application Ser. No. 263,887, filed June 19, 1972 (D No. 72,749). When ethyl chloride is used with hydrogen chloride as catalyst promoter, the amount of hydrogen chloride to effectively promote catalyst activity may be reduced to about 1 to about 6 pounds of hydrogen chloride per barrel of ethylene. Consequently, the portion of ethylene converted to ethyl chloride by reaction with hydrogen chloride may be substantially reduced. In copending application Ser. No. 263,888, filed June 19, 1972 (D No.72,836) a process is taught for recycling ethyl chloride from an alkylation reaction effluent back to an alkylation reaction zone for use as catalyst promoter, thereby reducing the amount of hydrogen chloride necessary to adequately promote catalytic activity of the aluminum chloride catalyst.

As aluminum chloride-hydrocarbon complex and liquid hydrocarbon reactanta are substantially immiscible, the alkylation reaction mixture is subjected to severe agitation or mixing in the reaction zone such that an emulsion is formed, thereby insuring good contact of hydrocarbon reactants with catalyst. An alkylation reaction effluent comprising this hydrocarbon-catalyst emulsion is separated by liquid-liquid separation means, such as gravity settling, centrifugation, coalescense, etc., into a hydrocarbon phase and a catalyst phase. It is economically desirable to recycle a major portion of the separated catalyst phase to the alkylation reaction to catalyze alkylation of additional hydrocarbon reactants while discarding as spent catalyst only a minor portion of the separated catalyst phase to remove catalyst degradation products, such as aluminum hydroxide and polymeric oils, from the alkylation process. The separated hydrocarbon phase of the alkylation reaction effluent comprises alkylated hydrocarbon, isobutane, unreacted ethylene, ethyl chloride, and impurities including methane, ethane, propane, normal butane, polymer hydrocarbons, and heavy alkylate hydrocarbons. The preferred alkylated hydrocarbon product from the alkylation reaction is 2,3-dimethylbutane which has an unleaded Research Octane Number greater than 100. Side reactions within the alkylation reaction produce less desirable hydrocarbon products including polymer hydrocarbons and heavy alkylate hydrocarbons. The side reaction product hydrocarbons have relatively low octane numbers and are undesirable as components of motor fuels. By properly selecting alkylation reaction conditions and severities the proportion of 2,3-dimethylbutane produced from reacted hydrocarbons may be maximized. However, at reaction conditions which produce the maximum 2,3-dimethyl-butane, substantial amounts of ethylene may remain unreacted in the alkylation reaction effluent. Ethylene is an expensive reactant in this alkylation process and it is economically desirable that conversion of ethylene be improved by recycling a portion of the separated hydrocarbon phase to the alkylation reaction zone. This results in recycle of a portion of the alkylated hydrocarbon as well. When such alkylated hydrocarbon is recycled to the alkylation reaction zone, additional amounts of undesirable heavy alkylate may be produced by further reaction of the recycled alkylate.

In addition to ethylene which is desirable for recycle, the separated hydrocarbon phase contains ethyl chloride which is useful as a promoter for aluminum chloride catalyst. Ethyl chloride and normal butane are both undesirable in the alkylate hydrocarbon product. Ethyl chloride reduces the octane number response of alkylate hydrocarbon to lead compounds and normal butane increases the vapor pressure of the alkylate hydrocarbon product to an undesirably high value. We have found that ethyl chloride, boiling point 55.6° F; and normal butane, boiling point 31° F; may be separated from $C_5+$ alkylate (isopentane boiling point 82° F.) and isobutane, boiling point 11° F; by fractional distillation means. In the process of the present invention, the separated hydrocarbon phase is fractionated in a debutanizer fractionation zone into a $C_5+$ alkylate fraction and a hydrocarbon recycle fraction. The $C_5+$ alkylate fraction is substantially free of normal butane and ethyl chloride although it may contain small amounts of aluminum chloride catalysts which may be entrained in the separated hydrocarbon phase. It is desirable, therefore, that the $C_5+$ alkylate fraction be treated by means such as caustic washing, bauxite treating, etc. to remove any traces of aluminum chloride therefrom before such $C_5+$ alkylate is employed in a motor fuel.

The hydrocarbon recycle fraction obtained from the debutanizer fractionation zone comprises isobutane, unreacted ethylene, ethyl chloride, and impurities including methane, ethane, propane, and normal butane. The isobutane, unreacted ethylene, and ethyl chloride are desirable materials for use in the alkylation reaction zone. Consequently, a major portion of the hydrocarbon recycle fraction is preferably returned to the alkylation reaction zone.

As the $C_1-C_4$ paraffins contained in the hydrocarbon recycle fraction increase in concentration in the alkylation reaction zone, they interfere with the alkylation reaction as diluents. In order to control the $C_1-C_4$ paraffin concentration within a desired range, it is necessary to treat hydrocarbon recycle to remove excessive amounts of these paraffins. It is also desirable, however, to return as much as possible of the hydrocarbon recycle fraction to the alkylation reaction zone in order that a substantial amount of unreacted ethylene may be converted. Therefore, a minor portion of hydrocarbon recycle fraction, sufficient only to remove excessive amounts of $C_1-C_4$ paraffins from the process system, is treated before being returned to the alkylation reaction zone. Thus, in the process of application Ser. No. 263,888, filed June 19, 1972 (D No. 72,836) a minor portion of the hydrocarbon recycle fraction is mixed with an isobutane charge stream to the process. Such make-up isobutane stream may contain impurities such as propane and normal butane. This recycle-charge hydrocarbon mixture is fractionated in a depropanizer fractionation zone into a $C_1-C_3$ fraction and a $C_4$ fraction. The $C_1-C_3$ fraction comprises methane, ethane, propane, and a small proportion of unreacted ethylene. The $C_4$ fraction comprises isobutane, normal butane, and a small amount of ethyl chloride. The $C_1-C_3$ fraction is removed from the process by venting or other means to eliminate $C_1-C_3$ paraffins. Ethylene loss from the process through this stream will vary according to the rate of conversion obtained in the alkylation reaction zone and to the proportion of the hydrocarbon recycle fraction which must be treated for control of the concentration of paraffinic hydrocarbon impurities. As it may be desirable to maintain ethylene conversion in the alkylation reaction zone at a relatively low value in the range of about 70% per pass in order to maximize the production of desired 2,3-dimethylbutane, the hydrocarbon recycle fraction may contain a substantial amount of ethylene. Most of the $C_1-C_3$ paraffin hydrocarbons, which must be eliminated from the process, enter as impurities in the ethylene and isobutane charge streams. Therefore, the portion of the hydrocarbon recycle fraction which must be treated to remove $C_1-C_3$ paraffins may be kept small by employing an ethylene charge of a relatively high degree of purity. For instance if an ethylene stream comprising about 98% ethylene is charged to an alkylation reaction wherein ethylene conversion is about 70%, it will be necessary to treat only about 10% of the hydrocarbon recycle fraction in order to remove the undesirable $C_1-C_3$ paraffins. Consequently, only about 3-4% or less of ethylene charged to the process will be lost in the $C_1-C_3$ effluent stream.

The $C_4$ fraction recovered from the bottom of the depropanizer fractionation zone comprises isobutane, normal butane, and ethyl chloride. Normal butane and ethyl chloride are both higher boiling than isobutane. The $C_4$ fraction may be fractionated in a deisobutanizer fractionation zone into an isobutane fraction and a normal butane-ethyl chloride fraction. The purified isobutane fraction, substantially free of normal butane and ethyl chloride, may be charged from the deisobutanizer fractionation zone to the alkylation reaction zone.

The normal butane-ethyl chloride fraction is then treated according to the method of the present invention to convert ethyl chloride into ethylene and hydrogen chloride.

The normal butane-ethyl chloride fraction, in the vapor phase, is contacted with bauxite catalyst in a bauxite treating zone at a temperature in the range of about 400°–1,000°F., and an ethyl chloride liquid hourly space velocity of about 0.1 to 5.0 volumes of ethyl chloride per hour per volume of bauxite. Under these conditions, ethyl chloride is converted to ethylene and hydrogen chloride. Normal butane is substantially unaffected and passes through the bauxite treating zone substantially without change.

Effluent from the bauxite treating zone comprises ethylene, hydrogen chloride, normal butane and any unconverted ethyl chloride. Ethylene and hydrogen chloride may be separated from butane and ethyl chloride by separation techniques well known in the art. For example, the bauxite treating effluent may be compressed to a pressure in the range of 70 to 300 psig and cooled to a temperature of about 100° to 200° F. Under these conditions of pressure and temperature, normal butane and ethyl chloride are condensed and ethylene and hydrogen chloride remain in the vapor phase. The exact conditions of pressure and temperature to condense normal butane and ethyl chloride will vary, depending upon partial pressure effects of the components in the bauxite treating effluent. However, one skilled in the art can readily determine the proper pressure and temperature required to selectively condense normal butane and ethyl chloride from vaporous ethylene and hydrogen chloride.

As a portion of the ethyl chloride remain unconverted upon a single pass through the bauxite treating zone, it is within the contemplation of the present invention to recycle unconverted ethyl chloride to the bauxite treating zone for further conversion. Bauxite treating zone effluent comprising ethylene, hydrogen chloride, normal butane and unconverted ethyl chloride may be recycled, or a portion of the condensed normal butane-ethyl chloride fraction may be vaporized and recycled. Additionally, if desired, the normal butane-ethyl chloride condensate may be fractionated to yield an ethyl chloride fraction for recycle to the bauxite treating zone. Preferably, a portion of the condensed normal butane-ethyl chloride fraction of the bauxite treating zone effluent is recycled. The amount of recycle is selected to ensure that a substantial amount of the ethyl chloride is converted in the bauxite treating zone.

The gaseous ethylene and hydrogen chloride recovered from the bauxite treating zone effluent may be recycled to the alkylation reaction zone. Ethylene recovered from the bauxite treating zone may amount to 2–3% of ethylene charge to the alkylation reaction. As ethylene is relatively expensive, recovery of this amount of ethylene represents a substantial economic savings for the process. The hydrogen chloride recycled may represent up to about 90 percent of hydrogen chloride required to promote catalytic activity of aluminum chloride catalyst. Recycle of this hydrogen chloride provides an economic savings in fresh hydrogen chloride as well as eliminating an acid removal step, such as a caustic wash, from the alkylation process.

In order to better explain the process of the present invention, attention is now drawn to the attached drawing. Following is a description of the invention with reference to the attached drawing which shows one embodiment of the present invention. The invention disclosed herein, the scope of which is defined in the appended claims, is not limited in its application to the details of the process and arrangement of parts shown and described in the drawing, since the invention is capable of other embodiments. Obvious variations and modifications of the present invention which are within the spirit and scope of the appended claims are considered to be incorporated herein. The attached drawing is a schematic representation of a process wherein isobutane is alkylated with ethylene in the presence of aluminum chloride catalyst, wherein a $C_5+$ alkylate substantially free of normal butane and ethyl chloride is produced, and wherein ethyl chloride is converted into ethylene and hydrogen chloride for recycle to the alkylation reaction.

In the drawing, isobutane substantially free of impurities from line 1 enters alkylation reaction zone 2. Ethylene from line 3 which may contain impurities such as ethane and propane, enters alkylation reaction zone 2. Hydrocarbon recycle, as will hereinafter be further described, comprising isobutane, ethylene, and ethyl chloride, enters alkylation reaction zone 2 via line 4. Alkylation catalyst from line 5, as will hereinafter be further described, enters alkylation reaction zone 2. Hydrogen chloride alkylation catalyst promoter enters alkylation reaction zone 2 via line 6. Ethylene and hydrogen chloride from line 39, as will hereinafter be further described, enters alkylation reaction zone 2.

In alkylation reaction zone 2, hydrocarbon reactants are maintained in the liquid phase at a temperature of from about 70° F. to about 150° F. and a pressure of about 45 psia to about 400 psia. The ratio of isobutane to ethylene is maintained in the range of about 2:1 to about 25:1 and preferably in the range of from about 4:1 to about 6:1. The alkylation catalyst which comprises an aluminum chloride-hydrocarbon complex is present in a volume ratio of catalyst to reactant hydrocarbon of from about 0.5:1 to about 3:1. As the catalyst is immiscible with the reactant hydrocarbon phase, adequate mixing or agitation is provided in alkylation reaction zone 2 to form an alkylation reaction emulsion.

From alkylation reaction zone 2, alkylation reaction emulsion is withdrawn via line 7 to a liquid-liquid separation zone 8 wherein alkylation reaction emulsion is separated, by means such as gravity settling and coalescence, into a catalyst phase and a hydrocarbon phase essentially free of entrained aluminum chloride catalyst phase. A minor portion of the catalyst phase is withdrawn from separation zone 8 via line 9 as spent catalyst and is discarded. A major portion of separated catalyst phase is withdrawn from separation zone 8 via line 5 for recycle to alkylation reaction zone 2, as hereinabove described. Fresh aluminum chloride-hydrocarbon complex catalyst, to make-up for that consumed in the process and removed as spent catalyst, is added to recycle catalyst in line 5 via line 10.

Separated hydrocarbon phase from separation zone 8 is transferred via line 11 to debutanizer fractionation zone 12. In debutanizer fractionation zone 12, separated hydrocarbon phase is fractionated into a $C_5+$ alkylate fraction and a hydrocarbon recycle fraction.

The $C_5+$ alkylate hydrocarbon fraction, comprising alkylated hydrocarbon and containing any entrained aluminum chloride catalyst from the separated hydrocarbon phase, is substantially free of normal butane and ethyl chloride. The $C_5+$ alkylate hydrocarbon fraction is transferred from debutanizer fractionation zone 12 to alkylate treatment, not shown, for removal of any entrained aluminum chloride or to storage via line 13.

The hydrocarbon recycle fraction recovered from debutanizer fractionation zone 12 via line 4 comprises isobutane, unreacted ethylene, ethyl chloride and impurities including methane, ethane, propane, and normal butane. A major portion of hydrocarbon recycle fraction in line 4 is returned to alkylation reaction zone 2, as hereinabove described. By this means, a major portion of unreacted ethylene is returned to alkylation reaction zone 2 for conversion and ethyl chloride, which is a promoter of aluminum chloride catalyst, is supplied to alkylation reaction zone 2. A minor portion of hydrocarbon recycle fraction, preferably in the range of about 5% to about 20% of the hydrocarbon recycle fraction, is withdrawn from line 4 via line 16 for treatment to remove $C_1-C_4$ normal paraffins and excessive amounts of ethyl chloride from the process. From line 16, the hydrocarbon recycle fraction is mixed with a dry isobutane make-up fraction in line 17, or, alternatively, the hydrocarbon recycle fraction from line 16 is transferred via line 18 for admixture with makeup isobutane, which may contain some water, in line 19. Isobutane in line 19 may contain some water and may contain propane and normal butane impurities. Additionally, the hydrocarbon recycle fraction may pick up some water during fractionation and may therefore contain some small amount of water. The mixture of make-up isobutane and hydrocarbon recycle fraction in line 19 passes into drying zone 20 wherein water is adsorbed therefrom employing water adsorbents such as silica gel, molecular sieves, etc.

From drying zone 20 the dry hydrocarbon mixture passes via line 17 into depropanizer fractionation zone 21. In depropanizer fractionation zone 21 the hydrocarbon mixture is separated into a $C_1-C_3$ fraction and a $C_4$ fraction. The $C_1-C_3$ fraction comprises methane, ethane, and propane as well as a small amount of unreacted ethylene. The $C_1-C_3$ hydrocarbon fraction is removed from the process via line 22.

The $C_4$ fraction from depropanizer fractionation zone 21 comprises isobutane, normal butane and ethyl chloride. The $C_4$ fraction is transferred from depropanizer fractionation zone 21 via line 23 to deisobutanizer fractionation zone 24. In deisobutanizer fractionation zone 24 the $C_4$ fraction is separated into an isobutane fraction and a normal butane-ethyl chloride fraction. The isobutane fraction from deisobutanizer fractionation zone 24 is transferred via line 1 to alkylation reaction zone 2 as hereinabove described.

The normal butane-ethyl chloride fraction from deisobutanizing zone 24 is passed via line 25 to heating zone 26. A recycle stream of normal butane and ethyl chloride from line 37, as will hereinafter be described, is also charged to heating zone 26. In heating zone 26, the butane and ethyl chloride are vaporized and heated to a temperature in the range of about 400°–1,000° F., preferably in the range of 500°–800° F. Vaporized effluent from heating zone 26 passes via line 27 into bauxite treating zone 28 wherein butane and ethyl chloride are contacted with a bauxite catalyst for conversion of ethyl chloride to ethylene and hydrogen chloride. In bauxite treating zone 28 the operating conditions are maintained to obtain a substantial conversion of ethyl chloride to ethylene and hydrogen chloride with substantially no conversion of butane. Effective operating conditions include temperatures in the range of 400°–1,000° F. and an ethyl chloride liquid hourly space velocity in the range of 0.1–5.0 volumes ethyl chloride per hour per volume of bauxite. Reaction pressure is not critical so long as butane and ethyl chloride are maintained in the vapor phase. Pressures in the range of from about atmospheric to about 100 psig may be employed while maintaining butane and ethyl chloride in the vapor phase within bauxite treating zone 28.

In operation of bauxite treating zone 28, carbonaceous deposits may gradually build-up on the bauxite catalyst. Such carbonaceous deposits are formed by degradation of carbon containing materials, such as ethylene and perhaps some butane into relatively high molecular weight carbonaceous materials, commonly referred to as "coke." Eventually the accumulation of coke on the bauxite catalyst increases to such a point that catalytic activity is affected. Operating temperature may be increased within the given range to maintain conversion of ethyl chloride for an extended time. When coke deposits become too great, however, the process must be discontinued and the bauxite catalyst replaced or regenerated. We have found that the bauxite catalyst may be effectively regenerated to remove coke and restore catalytic activity thereto by contacting the bauxite with a stream of air at a temperature of about 900° F. for a time sufficient to burn substantially all the coke. Upon regeneration, bauxite may be returned directly to the process for conversion of additional amounts of ethyl chloride.

Effluent from bauxite treating zone 28, comprising normal butane, unconverted ethyl chloride, ethylene, and hydrogen chloride, is passed via line 29 to effluent cooler 30. In cooler 30 the bauxite zone effluent is cooled by indirect heat exchange means with such materials as air, water, or other process streams. The bauxite zone effluent is cooled to a temperature in the range of about 100° to about 150° F. From effluent cooler 30, cooled effluent passes via line 31 to compressor 32 wherein the pressure is increased on the effluent stream prior to condensing butane therefrom. The compressed effluent stream passes from compressor 32 via line 33 to condenser 34 wherein butane and ethyl chloride are condensed and ethylene and hydrogen chloride remain in the vapor phase. The mixed liquid vapor effluent from condenser 34 flows via line 35 to separator drum 36. In separator drum 36 a vapor phase comprising ethylene and hydrogen chloride separates from a liquid phase comprising normal butane and ethyl chloride. Ethylene and hydrogen chloride vapor from separator drum 36 is recycled via line 39, as hereinabove described, to alkylation reaction zone 2 wherein ethylene is employed to alkylate additional isobutane and wherein hydrogen chloride activates the catalytic activity of aluminum chloride catalyst.

Normal butane from separation drum 36 is removed from the process via line 38. As conversion of ethyl chloride may not be complete upon one pass through bauxite treating zone 28, it may be desirable to recycle ethyl chloride. For this recycle purpose, a portion of the liquid phase, comprising normal butane and ethyl chloride, from separator drum 36 may be recycled via line 37 to the inlet of heating zone 26, as hereinabove described.

By following the process described above, isobutane may be alkylated with ethylene in the presence of an aluminum chloride catalyst in the form of an aluminum chloride-hydrocarbon complex under conditions such that ethylene conversion may be as low as about 70% per pass or lower and by employing the hydrocarbon recycle and ethyl chloride conversion the total conversion of ethylene may be maintained above 95%. Additionally, hydrogen chloride is recycled within the alkylation process.

From the embodiment of the invention as shown in the attached drawing and described above, it will be evident to those skilled in the art that modifications and variations are possible in an aluminum chloride catalyzed alkylation reaction without departing from the spirit and scope of the invention as set out in the appended claims.

We claim:

1. In an alkylation process wherein isobutane is alkylated with ethylene in the presence of a hydrogen chloride promoted, aluminum chloride alkylation catalyst to produce an alkylation reaction hydrocarbon effluent comprising isobutane, alkylated hydrocarbons, ethyl chloride, normal butane, and $C_1-C_3$ hydrocarbons; the improvement which comprises:
   a. fractionating the alkylation hydrocarbon effluent into a recycle isobutane fraction, an alkylated hydrocarbon product, a $C_1-C_3$ hydrocarbon fraction, and a normal butane-ethyl chloride fraction;
   b. contacting the normal butane-ethyl chloride fraction of Step a in the vapor phase with bauxite catalyst at a temperature in the range of from about 400°F. to about 1,000° F. and at an ethyl chloride liquid hourly space velocity of from about 0.1 to about 5.0 volumes of ethyl chloride per hour per volume of bauxite catalyst to produce a bauxite treating step effluent comprising normal butane, ethylene and hydrogen chloride;
   c. condensing normal butane from said bauxite treating step effluent to yield a vapor stream comprising ethylene and hydrogen chloride, and
   d. recycling ethylene and hydrogen chloride from Step c as reactants to the alkylation reaction.

2. The process of claim 1 wherein the bauxite treating Step b is operated at a temperature in the range of from about 600° to about 800° F.

3. The process of claim 2 wherein said bauxite treating step effluent contains unconverted ethyl chloride; wherein normal butane and ethyl chloride are condensed in step c to yield a liquid phase comprising normal butane and ethyl chloride and a vapor phase comprising ethylene and hydrogen chloride; and wherein at least a portion of the liquid phase comprising normal butane and ethyl chloride is recycled to said bauxite treating step for conversion of recycle ethyl chloride into ethylene and hydrogen chloride.

4. The method of claim 3 wherein at least about 95% of the ethyl chloride contained in the normal butane-ethyl chloride fraction of step a is converted into ethylene and hydrogen chloride in bauxite treating step b.

5. In a process for alkylating isobutane with ethylene wherein isobutane and ethylene in a molar ratio of from about 2:1 to about 25:1 isobutane to ethylene, are contacted in the liquid phase with an aluminum chloride-hydrocarbon complex alkylation catalyst in an alkylation zone wherein hydrogen chloride and ethyl chloride are employed as alkylation catalyst promoters, wherein an alkylation zone reaction emulsion comprising alkylation catalyst and hydrocarbon is separated into a catalyst phase and a hydrocarbon phase, wherein a major portion of the separated catalyst phase is recycled to the alkylation zone for alkylating additional amounts of isobutane with ethylene, and wherein the separated hydrocarbon phase comprises $C_5+$ alkylated hydrocarbons, isobutane, ethylene, ethyl chloride, normal butane, and $C_1-C_3$ paraffin hydrocarbons; the improvement which comprises:
   a. fractionating, in a first fractionation zone, the separated hydrocarbon phase into a $C_5+$ alkylate product substantially free of normal butane and ethyl chloride, and a hydrocarbon recycle fraction comprising isobutane, ethylene, ethyl chloride, normal butane, and $C_1-C_3$ hydrocarbons;
   b. recycling a major portion of said hydrocarbon recycle fraction to the alkylation reaction zone;
   c. fractionating in a second fractionation zone, a minor portion of said hydrocarbon recycle fraction into a $C_1-C_3$ fraction and a $C_4$ fraction comprising isobutane, ethyl chloride and normal butane;
   d. fractionating, in a third fractionation zone said $C_4$ fraction into an isobutane fraction and a normal butane-ethyl chloride fraction;
   e. contacting in a bauxite treating zone the normal butane-ethyl chloride fraction of Step d with bauxite catalyst at a temperature of from about 400° F. to about 1,000° F. in the vapor phase, at a liquid hourly space velocity of ethyl chloride to bauxite catalysts of from about 0.1 to about 5.0 volumes of ethyl chloride per hour per volume of bauxite catalyst to convert said ethyl chloride into ethylene and hydrogen chloride;
   f. separating the effluent from the bauxite treating zone of step e into a normal butane fraction and a fraction comprising ethylene and hydrogen chloride, and;
   g. recycling ethylene and hydrogen chloride from Step f to said alkylation zone.

6. The method of claim 5 wherein the temperature employed in the bauxite treating zone is in the range of from about 600°–800° F.

7. The process of claim 6 wherein the normal butane fraction is separated from the ethylene-hydrogen chloride fraction by condensing normal butane into the liquid phase.

8. The process of claim 5 wherein the bauxite treating step e produces a bauxite treating step effluent comprising unconverted ethyl chloride, normal butane, ethylene, and hydrogen chloride; wherein said bauxite treating step effluent is separated into a normal butane-ethyl chloride fraction and an ethylene-hydrogen chloride fraction; and wherein a portion of said normal butane-ethyl chloride fraction is recycled to said bauxite treating step e for conversion of additional amounts of ethyl chloride into ethylene and hydrogen chloride.

* * * * *